United States Patent
Han et al.

(10) Patent No.: US 9,471,240 B2
(45) Date of Patent: Oct. 18, 2016

(54) PERFORMING READ AND WRITE OPERATIONS WITH RESPECT TO AT LEAST ONE SOLID STATE DISK AND AT LEAST ONE NON-SOLID STATE DISK

(75) Inventors: Zhu Han, Shanghai (CN); Hai Chuan Wang, Shanghai (CN); Hai Yong Zhang, Beijing (CN); Yi Xin Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 380 days.

(21) Appl. No.: 13/164,699

(22) Filed: Jun. 20, 2011

(65) Prior Publication Data
US 2011/0320709 A1    Dec. 29, 2011

(30) Foreign Application Priority Data
Jun. 24, 2010   (CN) .......................... 2010 1 0213533

(51) Int. Cl.
*G06F 3/06* (2006.01)

(52) U.S. Cl.
CPC ............... *G06F 3/064* (2013.01); *G06F 3/061* (2013.01); *G06F 3/068* (2013.01); *G06F 3/0617* (2013.01); *G06F 3/0652* (2013.01); *G06F 2212/217* (2013.01)

(58) Field of Classification Search
CPC ................ G06F 3/068; G06F 3/0685; G06F 2212/217; G06F 3/061; G06F 3/0617; G06F 3/064; G06F 3/065
See application file for complete search history.

(56) References Cited

U.S. PATENT DOCUMENTS

| | | | |
|---|---|---|---|
| 6,467,022 B1 | 10/2002 | Buckland et al. | |
| 6,766,429 B1 * | 7/2004 | Bland et al. | ................. 711/161 |
| 8,130,554 B1 * | 3/2012 | Linnell | ................. 365/185.28 |
| 8,566,549 B1 * | 10/2013 | Burke | ................. G06F 3/0611 |
| | | | 711/114 |
| 2006/0218200 A1 * | 9/2006 | Factor et al. | ................. 707/200 |
| 2007/0033362 A1 * | 2/2007 | Sinclair | ................. 711/165 |
| 2008/0288714 A1 | 11/2008 | Salomon et al. | |

(Continued)

FOREIGN PATENT DOCUMENTS

| | | |
|---|---|---|
| CN | 101238431 | 8/2008 |
| CN | 101673188 | 3/2010 |
| WO | 2008/083904 | 7/2008 |

OTHER PUBLICATIONS

"Considering the 2.5-inch SSD-based RAID Solution: Using Infortrend EonStor B12 Series with Intel SSD in a Microsoft SQL Environment Application Note", Infortrend, pp. 1-9.

(Continued)

*Primary Examiner* — Edward Dudek, Jr.
*Assistant Examiner* — Ralph A Verderamo, III
(74) *Attorney, Agent, or Firm* — David W. Victor; Konrad Raynes Davda & Victor LLP

(57) ABSTRACT

A storage system and a method for realizing a storage system is disclosed, the storage system comprising: a disk array comprising at least one solid state disk and at least one non-solid state disk; and a storage control means configured to: in response to entering a scrubbing mode, scan and move data blocks in the at least one non-solid state disk in the disk array to form more continuous free blocks. The storage system of the present invention has good read and write performances, higher data reliability and availability, and lower cost.

22 Claims, 4 Drawing Sheets

(56) References Cited

U.S. PATENT DOCUMENTS

| | | | |
|---|---|---|---|
| 2009/0043831 A1* | 2/2009 | Antonopoulos et al. | 707/205 |
| 2009/0049238 A1* | 2/2009 | Zhang et al. | 711/113 |
| 2009/0132752 A1* | 5/2009 | Poo et al. | 711/103 |
| 2009/0157991 A1* | 6/2009 | Rajan et al. | 711/162 |
| 2009/0204758 A1* | 8/2009 | Luning | 711/114 |
| 2009/0276567 A1 | 11/2009 | Burkey | |
| 2009/0327603 A1 | 12/2009 | McKean et al. | |
| 2010/0017565 A1* | 1/2010 | Kwon et al. | 711/112 |
| 2010/0079885 A1 | 4/2010 | McKean | |
| 2010/0088459 A1 | 4/2010 | Arya et al. | |
| 2010/0281230 A1* | 11/2010 | Rabii et al. | 711/165 |
| 2011/0153931 A1* | 6/2011 | Bell et al. | 711/114 |
| 2011/0219170 A1* | 9/2011 | Frost et al. | 711/103 |

OTHER PUBLICATIONS

"Proceedings of 24th IEEE International Parallel and Distributed Processing Symposium", IEEE, 2010, pp. 1-108.

B. Mao, et al., "Hybrid Parity-Based Disk Array for Enhanced Performance and Reliablity", IEEE, 2010, pp. 1-12.

Chinese Office Action dated Jul. 23, 2013 for CN App. No. 201010213533, filed Jun. 24, 2010.

Information Materials for IDS dated Jul. 26, 2013 for CN App. No. 201010213533, filed Jun. 24, 2010.

US Publication 2007/0033362, dated Feb. 8, 2007, is an English language equivalent of CN101238431 dated Aug. 6, 2008.

English Translation of CN101238431 dated Aug. 6, 2008.

English Translation of CN101673188 dated Mar. 17, 2010.

\* cited by examiner

PERFORMING READ AND WRITE OPERATIONS WITH RESPECT TO AT LEAST ONE SOLID STATE DISK AND AT LEAST ONE NON-SOLID STATE DISK

CROSS-REFERENCE TO RELATED FOREIGN APPLICATION

This application is a non-provisional application that claims priority benefits under Title 35, Unites States Code, Section 119(a)-(d) from Chinese Patent Application entitled "REALIZING A STORAGE SYSTEM" by Zhu HAN, Hai Chuan WANG, Hai Yong ZHANG, and Yi Xin ZHAO, and having Chinese Patent Application Serial No. 201010213533.X, filed on Jun. 24, 2010, which application is incorporated herein by reference in its entirety.

BACKGROUND

1. Field of the Invention

The present invention relates to the computer field, and particularly, to a storage system and a method for realizing the storage system.

2. Description of the Related Art

The storage system is one of the most important components in a computer system. It is always desired that the storage system has high speed (high IOPS and high throughput), high reliability and low cost.

Most existing servers or PCs still use hard disk drives (HDD) as the major storage system. Although an HDD-based storage system has low cost, the improvement of HDD access latency in recent years lags far behind the improvement of its capacity. High latency will greatly influence the IOPS (I/O Operations Per Second) value. Especially for a working load where random I/Os dominate, e.g., a database working load, the HDD will become a performance bottleneck; while for a working load where sequential accesses dominate, the access performance of the HDD is better. For example, a current single HDD will get a sustained transmission rate of, up to 160 MB/s.

Compared with HDD, solid state disks (SSD) emerging in recent years have lower random access latency (0.03 ms of SSD vs. 5 ms of HDD), higher read IOPS (35000 of SSD vs. 200 of HDD). Although at first the capacities of SSDs are small, in recent years, they are gradually catching up with those of HDDs. For example, now there are some SSDs of 2TB as high-end products. The energy consumptions of SSDs are also lower than those of HDDs. However, SSDs have the following drawbacks: firstly, the costs of SSDs are far higher than those of HDDs (taking the current market prices as an example, $10/GB of SSD vs. $0.6/GB of HDD). In an SSD, the controller is extraordinarily expensive. Secondly, each cell of an SSD only has limited write cycles, which will impact its reliability. Although several techniques have been introduced to overcome the problem, they will increase the cost of the controller and reduce the IPOS and throughput. Thirdly, the read and write performances of SSD are unsymmetrical. The write latency of a SSD is 10 times larger than the read latency. This is because the write operation must first erase the whole block (each block is about 0.5-1 MB), and then write the original data in the block to the block together with the new data, which operation is very slow.

It is an important goal to make the storage system have high read and write performance, high reliability and low cost. Currently, there are several solutions as follows:

The first is to form a RAID (Redundant Array of Independent Disk) by HDDs, and distribute random reads and writes to several HDDs, so as to improve the read and write performance and reliability. However, this solution has high cost of energy consumption, and the data center rack occupies large space, and the performance improvement is limited.

The second is to utilize the lower read latency of SSDs, and in the meantime to alleviate the disadvantageous effects of random writes by using the merging of partially-occupied blocks and wear-leveling algorithm realized in the controller firmware, which includes: writing date in large continuous segments, merging the partially-occupied blocks at background and performing garbage collection on free blocks, and avoiding continually writing into some hot blocks. However, constant background file system 104 scanning to identify the partially-occupied blocks and free blocks will consume considerable bandwidth of the SSD controller. Moreover, it is difficult and costly for the firmware to realize a complex garbage collection algorithm. In addition, a single SSD is unable to provide high availability, while an SSD array is excessively expensive.

The third is to use SSDs as the cache of HDDs. This solution does not have the high reliability feature, and has the disadvantageous effects of writes, e.g., the write cycles are limited and the write latency is too long.

The fourth is to combine SSDs and HDDs, and perform manual data partition. For example, in GPFS (General Parallel File System), through manual distribution, metadata is stored in SSDs, while data is stored in HDDs. This solution will not only bring a great management burden, but also fail to realize high data read and write performance and high data availability.

SUMMARY

Provided is a storage system comprising a disk array comprising at least one solid state disk and at least one non-solid state disk; and a storage control means configured to, in response to entering a scrubbing mode, scan and move data blocks in the at least one non-solid state disk in the disk array to form more continuous free blocks.

Further provided is a method for realizing a storage system, wherein the storage system comprises a disk array which comprises at least one solid state disk and at least one non-solid state disk, and, in response to entering a scrubbing mode, scanning and moving data blocks in the at least one non-solid state disk of the disk array to form more continuous free blocks.

BRIEF DESCRIPTION OF DRAWINGS

The appended claims set forth the inventive features which are considered as characteristic of the present invention. However, the invention itself and its preferred embodiments, additional objects, features and advantages will be better understood by referring to the detailed description of the exemplary embodiments when read in conjunction with the attached drawings, in which:

DETAILED DESCRIPTION

Embodiments of the present invention will now be described with reference to the accompanying drawings. In the following description, numerous details are described to enable the present invention to be fully understood. However, it is obvious to those skilled in the art that the realization of the present invention can be without some of these details. In addition, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

Figure 1:
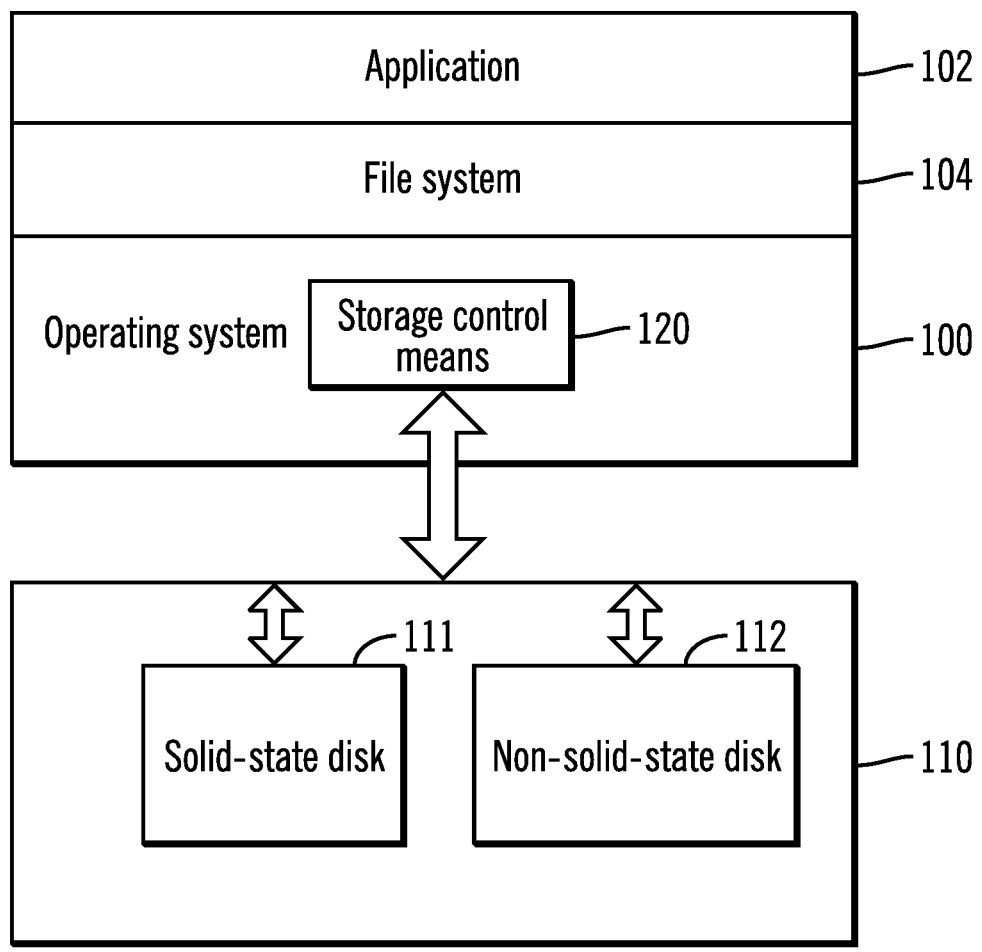
FIG. 1 shows a storage system according to an embodiment of the present invention.

Now referring to FIG. 1, it shows a storage system according to an embodiment of the present invention. As shown, the storage system comprises: a disk array 110 which comprises at least one solid state disk 111 and at least one non-solid state disk 112; and a storage control means 120 configured to in response to entering a scrubbing mode, scan and move data blocks in the at least one non-solid state disk in the disk array to form more (i.e., compared with prior to scanning and moving) continuous free blocks.

The non-solid state disk 112 refers to a storage medium that will cause seek delay for random reads and writes, and will have higher speed (e.g., approximate to the write speed of a solid state disk) during sequential reads. A typical example is a hard disk drive (HDD), which moves a magnetic head over tracks and sectors to read and write data when the disk rotates. Therefore, during random reads and writes, seek delay will be caused, while during sequential writes, the seek delay may be saved. Other examples are optical disks like some erasable and writable CD, DVD as well as magnetic optical disks, and their sequential write speeds are high, approaching that of an SSD.

Although the drawing only illustrates one solid state disk 111 and one non-solid state disk 112, the present invention is not limited thereto. The disk array 110 of the storage system according to embodiments of the present invention may also comprise multiple solid state disks 111 and one non-solid state disk 112 (which may be called N+1 mode), or comprise a solid state disk 111 and multiple non-solid state disks 112 (which may be called 1+M mode), or comprise multiple solid state disks 111 and multiple non-solid state disks 112 (which may be called N+M mode). In the following, an embodiment of the present invention will be described by taking a disk array 110 of the storage system, which comprises a solid state disk 111 and a non-solid state disk 112, as an example.

In a preferred embodiment of the present invention, the storage control means 120 is realized by a device driver in an operating system (OS) 100. In other embodiments of the present invention, the storage control means 120 can also be realized by other devices or functional modules. For example, it can be realized by the controller of the disk array 110. Although in a preferred embodiment of the present invention, all the functions of the storage control means 120 are realized by software, in other embodiments of the present invention, all or part of the functions of the storage control means 120 can also be realized by firmware or hardware.

The storage control means 120 is configured to receive storage operation requests from an upper level application 102 through a file system 104, to process the storage operation requests by performing corresponding operations on the disk array 110, and returning the processing results to the upper level application 102.

According to an embodiment of the present invention, the storage control means 120 is further configured to, in response to entering a read mode, read corresponding data from the solid state disk 111, and in response to entering a write mode, write corresponding data to the solid state disk 111 and the non-solid state disk 112. When the storage control means 120 receives and starts to process a read request from the upper level application 102, it enters the read mode. During the read mode, the storage control means 120 will only read the requested data from the solid state disk 111. Since the solid state disk 111 has a higher read access speed, it will satisfy the read request more rapidly. When the storage control means 120 receives and processes a write request from the upper level application 102, it enters the write mode. During the write mode, the storage control means 120 writes the data requested to be written into both of the solid state disk 111 and the non-solid state 112, respectively. Since the storage control means 120 can write the data into the continuous free blocks generated on the non-solid state disk 112 and the free blocks generated on the solid state disk 111 in the scrubbing mode, the solid state disk 11 and the non-solid state disk 112 both can provide very high write performance. Since the same data are written into the both positions of the solid state disk 111 and the non-solid state 112, when data in one disk is unusable (e.g., due to malfunction or wear of the disk), data in the other disk can be provided, so that the reliability and availability of the data are improved.

According to an embodiment of the present invention, the storage control means 120 is further configured to: after reading the corresponding data from the solid state disk 111, verify the integrity of the corresponding data; in response to the verification passing, return the corresponding data to the upper level application 102; and in response to the verification not passing, read the corresponding data from the non-solid state disk 112, restore the corresponding data to the solid state disk 111 and return the corresponding data to the upper level application 102.

The integrity of the data can be verified by, for example, using a parity bit stored together with the data. After the corresponding data is read from the non-solid state disk 112, the integrity of the data may be verified first. If the verification is passed, the data is restored to the solid state disk 111 and returned to the upper level application 102; if the verification is not passed, an error is returned. In addition, if the verification is not passed, the event can be written into a log and a notification can be issued for the administrator to take remedies.

After the operation of restoring the data to the solid state disk 111 is executed, it may be also be first determined whether the data has been successfully restored to the solid state disk 111. If the data has been successfully restored to the solid state disk 111, the data is returned to the upper level application 102; otherwise, an error is returned. In addition, when the data has not been successfully restored to the solid state disk 111, the event may further be recorded into the log, and a notification may be issued for the administrator to take remedies.

According to an embodiment of the present invention, writing the corresponding data to the non-solid state disk 112 comprises: looking for continuous free blocks in the non-solid state disk 112, and writing the corresponding data to the continuous free blocks in the non-solid state disk 112. When data is written to the non-solid state disk 112 like HDDs, if data is written to continuous free blocks therein, the seek time may be saved, so that the write speed is improved, possibly up to be equivalent to the speed of writing data to the solid state disk 111, thus making the storage system according to the embodiment of the present invention not only have good read performance, but also have good write performance.

According to an embodiment of the present invention, if no sufficient continuous free blocks are found in the non-solid state disk 112, the corresponding data can be written into discontinuous blocks in the non-solid state disk 112, thus the write performance may be reduced. Therefore, a corresponding event (e.g., that the non-solid state disk 112 does not have sufficient continuous free blocks) may be recorded in the log or a notification may be issued, so that the storage control means 120 or the administrator may take remedies, e.g., making the storage control means 120 enter the scrubbing mode as described below, so as to scrub the data in the non-solid state disk 112 to form more continuous free blocks, or transfer the data in the non-solid state disk 112, or replace the non-solid state disk 112, and so forth.

Various methods can be used to look for the continuous free blocks in the non-solid state disk 112. For example, a record of all the free blocks in the non-solid state disk 112 may be maintained by the storage control means 120. Whenever data is written into the non-solid state disk 112 or data in the non-solid state disk 112 is deleted, the record is updated correspondingly to make the record always record all the free blocks in the non-solid state disk 112; in addition, when the non-solid state disk 112 is scrubbed in the scrubbing mode as described below, the record is also updated correspondingly. Thus, the continuous free blocks in the solid state disk 111 can be looked for by querying the record. Of course, other methods can also be used to look for the continuous free blocks in the non-solid state disk 112. For example, the continuous free blocks in the non-solid state disk 112 can be looked for by directly scanning the non-solid state disk 112.

When data is written into the solid state disk 111, the wear-leveling algorithm can be used. In the prior art, this function is usually realized in the controller firmware of the solid state disk 111. However, in an embodiment of the present invention, the function is realized in the driver of the operating system 100, thus greatly saving the firmware cost of the solid state disk 111.

As described above, according to an embodiment of the present invention, in the scrubbing mode, the storage control means 120 scans the non-solid state disk 112, and moves data blocks therein, so as to form more continuous free blocks. Thus, when new data is written, it is more possible to find out continuous free blocks, and write the data into the continuous free blocks, rather than writing the data into discontinuous free blocks, so that the write speed is increased. After moving data blocks, the storage control means 120 may correspondingly update the above record of all the free blocks, to reflect the new free blocks formed by moving the data blocks in the non-solid state disk 112.

According to an embodiment of the present invention, the storage control means 120 is further configured to: in the scrubbing mode, scan and merge the partially-occupied data blocks in the solid state disk 111 in the disk array 110 to form more entirely free blocks. That is to say, by merging data in multiple partially-occupied data blocks into one or more blocks to make the one or more blocks be entirely-occupied data blocks, more entirely free blocks may be saved (since the solid state disk is a random access storage, the access time to the data is irrelevant to the physical position of the data on the disk, and thus there is no need for the free blocks to be continuous). Thus, when data is written in the solid state disk 111, it is more possible to write data in entirely free blocks. As known by those skilled in the art, when data is written into the entirely free blocks in the solid state disk, the work of reading the original data of the block and erasing the entire data block can be spared, so that the write performance of the solid state disk is improved greatly. In the current solid state disk technology, the function of merging partial-free blocks is realized in the controller firmware. In an embodiment of the present invention, the function is realized in the driver of the operating system 100, so that the cost of the firmware is saved.

Many policies can be used to specify how the storage control means 120 enters and exits the scrubbing mode. Each policy specifies the specific event for triggering entering the scrubbing mode. Only as an example, the first policy may specify that when no read request or write request is received within a predetermined time threshold T, the scrubbing mode is entered. When the ratio of the continuous free blocks to all the free blocks in the non-solid state disk 112 exceeds a predetermined ratio threshold C, or when a read request or a write request is received, the scrubbing mode may be exited.

The second policy may specify that when the disk bandwidth utilization is lower than a predetermined utilization threshold BW, the scrubbing mode is entered. When the disk bandwidth utilization exceeds the predetermined utilization threshold BW, or when the ratio of the continuous free block to all the free blocks in the non-solid state disk 112 exceeds the predetermined ratio threshold C, the scrubbing mode may be exited.

The third policy may specify that when the length of the request queue for receiving read requests and write requests from the upper level application 102 in the storage control means 120 is smaller than a predetermined length threshold QL, the scrubbing mode is entered. When the length of the request queue is larger than the predetermined threshold QL, or when the ratio of continues free blocks to all the free blocks in the non-solid state disk 112 exceeds a predetermined ratio threshold C, the scrubbing mode is exited.

In addition, the scrubbing mode may also be entered by the administrator's manually commanding, or in response to receiving a notification that there are no sufficient continuous free blocks in the non-solid state disk 112. Of course, it may be further specified in each policy that only when the ratio of the continuous free blocks to all the free blocks in the non-solid state disk 112 is lower than a predetermined ratio threshold D (which may be smaller than or equal to the above predetermined ratio threshold C), the scrubbing mode is entered. Further, when the ratio of the continuous free blocks to all the free blocks in the non-solid state disk 112 is equal to or larger than the predetermined ratio threshold D, the scrubbing mode is not entered. Or, after the storage control means 120 receives the specific event for triggering entering the scrubbing mode as specified by the specified specific policy, it further determines whether the ratio of the continuous free blocks to all the free blocks in the non-solid state disk 112 is lower than the predetermined threshold D. The scrubbing mode is entered only when the decision is yes and the scrubbing mode is not entered when the decision is no. The storage control means 120 may determine whether ratio of the continuous free blocks to all the free blocks in the non-solid state disk 112 is lower than the predetermined ratio threshold by checking the above record of all the free blocks in the non-solid state disk 112. In addition, a priority scheduling policy may be set to specify that the priority P of the I/O requests generated by the scrubbing mode is lower than the priority Q of the read requests and the write requests generated by an upper level application 102, and the storage control means 120 performs the scheduling according to the priorities, which may guarantee that the I/O requests generated by the scrubbing mode will not interfere with the operations of the application 102.

The above policies are only exemplary, rather than limitation to the present invention. In some embodiments of the present invention, other policies may be used to specify how to enter and exit the scrubbing mode.

According to an embodiment of the present invention, the storage control means 120 may provide a policy definition interface to an upper level layer (e.g., the file system 104 or the operating system 100), and the administrator may designate a policy for entering and exiting the scrubbing mode via the interface, and set parameters like the thresholds required by the policy. For features of different upper level application 102, different policies may be designated and different parameters may be set.

For example, for a Web server with frequent accesses, its average read and write interval is 1 second, and the bandwidth from the CPU to the disk is 200 MB/S, and the above first policy may be designated, and T=0.5 second may be set. That is to say, if there is no read or write access within 0.5 second, the scrubbing mode is entered. Or, the above second policy may be designated, and BW=50 MB/S may be set. That is to say, when the disk bandwidth utilization is below 50 MB/S, the scrubbing mode is entered. If the current bandwidth utilization is above 50 MB/S, the scrubbing mode is exited. Or, the above third policy may be designated, and QL=100 may be set. That is to say, the scrubbing mode is entered only when the queue length of the requests generated by the upper level application 102 in the driver is lower than 100. Once the queue length exceeds 100, the scrubbing mode is exited. In addition, the above priority scheduling policy may also be designated, and the priority level of the I/O requests generated by the scrubbing mode may be set to be 5, while the priority level of the I/O requests generated by the upper level application 102 may be set to be 15. Thus, the scheduling function in the storage control means 120 can guarantee that the requests generated in the scrubbing mode will not interfere with the operations of the application 102. In addition, the above predetermined ratio threshold C for exiting the scrubbing mode may be set to be 25%. That is to say, when the continuous available space of the system exceeds 25% of the available space, the scrubbing mode may be exited. By designating and setting the policies described above, frequent accesses to the Web server and reads and writes to small files (e.g., various small pictures on a web page) may be optimized.

Still for example, for a file server of an enterprise, its average read and write interval is 20 seconds, and the above first policy may be designated, and T=10 seconds may be set. That is to say, if there is no read or write access within 10 seconds, the scrubbing mode is entered. Or, the above second policy 2 may be designated, and BW=20 MB/S may be set. That is to say, the scrubbing mode is entered only when the disk bandwidth utilization is below 20 MB/S. If the current bandwidth utilization is above 20 MB/S, the scrubbing mode is exited. Or, the above third policy may be designated, and QL=200 may be set. That is to say, the scrubbing mode is entered only when the queue length of the requests generated by the upper level application 102 in the driver is lower than 200; once the queue length exceeds 200, the scrubbing mode is exited. In addition, the above priority scheduling policy can also be designated, and the priority level of the I/O requests generated by the scrubbing mode may be set to be 8, and the priority level of I/O requests of the upper level application 102 may be set to be 15. Thus, the scheduling function in the storage control means 120 will guarantee that the I/O requests generated in the scrubbing mode will not interfere with the operations of the application 102. In addition, the above predetermined ratio threshold C for exiting the scrubbing mode may be set to be equal to 50%. That is to say, only when the continuous available space in the system exceeds 50% of the available space, the scrubbing mode may be exited; when it is below 50%, the disk scanning, computing and data block moving should continue to be performed, so as to make the continuous available space reach more than 50% of the available space. By designating and setting the above policies, accesses of low frequency to the file servers and with large quantity of data each time (e.g., upload of files of hundreds of megabytes, or even several gigabytes (GBs)) can be optimized.

According to an embodiment of the present invention, the storage control means 120 is further configured to, in the scrubbing mode, determine whether a specific event for triggering exiting the scrubbing mode is received, which specific event may be the specific event specified by the above policies to trigger exiting the scrubbing mode, e.g., the ratio of the continuous free blocks to all the free blocks in the non-solid state disk exceeds a predetermined ratio threshold C, etc. If the decision is no, the scrubbing operation on the non-solid state disk 112 and the solid state 111 is continued as described. If the decision is yes, the scrubbing mode is exited.

Above is described the storage system according to embodiments of the present invention, wherein the storage control means 120 writes data to both the solid state disk 111 and the non-solid state 112 in the write mode; and the storage control means 120 reads data only from the solid state disk 111 in the read mode. However, this is not limitation to the present invention. In other embodiments of the present invention, the data of all write requests is not written into both the solid state disk 111 and non-solid state disk 112. Instead, only the data of the write requests with high availability requirement is written into both the solid state disk 111 and the non-solid state disk 112, and the data of the write request without the high availability requirement is written only into the non-solid state disk 112. In addition, in the subsequent scrubbing mode, the data without high availability requirement but accessed frequently may be transferred from the non-solid state disk 112 to the solid state disk 111. In this way, not only the high reliability and high availability of the data of specific applications 102 are guaranteed discriminately, but also the data access speeds of specific applications are guaranteed discriminately.

Therefore, according to another embodiment of the present invention, the storage control means 120 is configured to, in response to starting to process a read request to a file, determine whether the file is in the solid state disk 111. In response to determining that the file is in the solid state disk 111, the file is read from the solid state disk 111. In response to determining that the file is not in the solid state disk 111, the file is read from the non-solid state disk 112. In response to starting to process a write request to a new file, a determination is made as to whether the new file has the high availability requirement and in response to determining that the new file has the high availability requirement, the new file is written to the solid state disk 111 and the non-solid state disk 112. In response to determining that the new file does not have the high availability requirement, the new file is written only to the non-solid state disk 112. According to a further embodiment of the present invention, the storage control means 120 may be further configured to, in response to determining that the file is in the solid state disk 111 and after reading the file from the solid state disk 111, verify the integrity of the file data; in response to that the verification is passed, return the corresponding data to the upper level application 102; and in response to that the verification is not passed, read the file from the non-solid state disk 112, and return the corresponding data to the upper level application 102.

According to a further embodiment of the present invention, the storage control means 120 is further configured to: in response to reading a file from the solid state disk 111 or the non-solid state disk 112, update the access frequency of the file; in the scrubbing mode, in response to determining that the access frequency of a file is higher than a predetermined threshold, the file only exists in the non-solid state disk 112, and the solid state disk 111 has sufficient available space, transfer the file from the non-solid state disk 112 to the solid state disk 111; and in the scrubbing mode, in response to determining that the access frequency of a file is lower than a predetermined threshold and the file only exists in the solid state disk 111, transfer the file from the solid state disk 111 to the non-solid state disk 112.

In these embodiments of the present invention, the storage control means 120 is further configured to execute the various operations for scrubbing the data blocks in the non-solid state disk and the solid state disk in the scrubbing mode as described above.

Above is described the storage system according to embodiments of the present invention by taking the storage array comprising a solid state disk 111 and a non-solid state 112 as an example. However, this is not a limitation to the present invention.

In some other embodiments of the present invention, the storage array of the storage system may comprise multiple solid state disks 111 and one non-solid state disk 112 (N+1 mode), e.g., 4 solid state disks 111 and 1 non-solid state disk 112. This mode is suitable for the case where the capacity of a solid state disk 111 is small. Since currently a solid state disk 111 still has high cost and small capacity, and the cost of a high-capacity solid-state-disk 111 is much higher, e.g., the cost of 4 small-capacity solid state disks 111 may be lower than that of one large-capacity solid state disk 111, such an embodiment may reduce the cost of the storage system. In such an embodiment, the storage control means 120 in the storage system will treat the multiple solid state disks 111 as one big solid state disk 111, and perform the various operations described above. That is to say, in the read mode, the storage control means 120 may read the corresponding data from one of the multiple solid state disks; in the write mode, the storage control means 120 may write the corresponding data to one of the multiple solid state disks and the non-solid state disk; while in the scrubbing mode, the storage control means 120 may optionally scrub the multiple solid state disks to merge partially-occupied data blocks.

In some other embodiments of the present invention, the storage array of the storage system may comprise a solid state disk 111 and multiple non-solid state disks 112 (1+M mode), e.g., 1 solid state disk 111 and 3 non-solid state disks 112. This mode is suitable for the case where the number of concurrent writes and the requirement for the write bandwidth are very high. When it is needed to write files, according to different reliability requirements of different files, files with high reliability requirement may be written into at least two non-solid state disks 112, while files without the high reliability requirement may only be written into one non-solid state disk 112. Moreover, in the scrubbing mode, according the read frequencies of files, files with high read frequencies may be transferred from the non-solid state disk 112 to the solid state disk 111. Of course, in the scrubbing mode, the non-solid state disks 112 are scanned and scrubbed to form more continuous free blocks, and optionally, the solid state disk 111 is scanned to merge partially-occupied data blocks.

Therefore, according to these embodiments of the present invention, the storage control means 120 is configured to: in response to starting to process a read request to a file, determine whether the file exists in the solid state disk 111; in response to determining that the file exists in the solid state disk 111, read the file from the solid state disk 111; in response to demining that the file does not exists in the solid state disk 111, read the file from the multiple non-solid state disks 112; in response to starting to process a write request to a new file, determine whether the new file has the high availability requirement; in response to determining that the new file has the high availability requirement, write the new file to at least two of the multiple non-solid state disks 112; and in response to determining that the new file does not have the high availability requirement, write the new file only to one of the multiple non-solid state disks 112.

According to these embodiments of the present invention, the storage control means 120 is further configured to: in response to reading a file from the solid state disk 111 or the multiple non-solid state disks 112, update the access frequency of the file; in the scrubbing mode, in response to determining that the access frequency of a file is higher than a predetermined threshold, and the file only exists in the multiple non-solid state disks 112 and the solid state disk 111 has sufficient available space, transfer the file from the multiple non-solid state disks 112 to the solid state disk 111; and in the scrubbing mode, in response to determining that the access frequency of a file is lower than a predetermined threshold, and the file only exists in the solid state disk 111, the file is transferred from the solid state disk 111 to one of the multiple non-solid state disks 112.

According to these embodiments of the present invention, the storage control means 120 is further configured to: in response to entering the scrubbing mode, scan the multiple non-solid state disks 112 and move the data blocks therein to form more continuous free blocks.

According to a further embodiment of the present invention, the storage control means 112 is further configured to: in the scrubbing mode, scan and merge partially-occupied data blocks in the solid state disk 111 in the disk array 110 to form more entirely free blocks.

In yet some other embodiments of the present invention, the storage array of the storage system may comprise multiple solid state disks 111 and multiple non-solid state disks 112 (N+M mode), e.g., 2 solid state disks 111 and 3 non-solid state disks 112. In such a mode, different levels of reliability requirement can be defined, and files with higher levels of reliability requirement can be written into more disks. For example, for a storage system comprising 2 solid state disks 111 and 3 non-solid state disks 112, the following 5 levels of reliability requirements may be defined:

Level 1 (default): write the new file into 1 non-solid state disk 112, with the lowest reliability;
Level 2: write the new file into 2 non-solid state disks 112;
Level 3: write the new file into 3 non-solid state disks 112;
Level 4: write the new file into 3 non-solid state disks 112 and 1 solid state disk 111;
Level 5: write the new file into 3 non-solid state disks 112 and 2 solid state disks 111, with the highest reliability.

When files need to be written, according to different levels of reliability requirement of different files, files are written into different numbers of non-solid state disks 112 or solid state disks 111. Moreover, in the scrubbing mode, according to the read frequencies of files, files with higher read frequencies are transferred from the non-solid state disks 112 to the solid state disk 111. Of courses, in the scrubbing mode, the non-solid state disks 112 are scanned and scrubbed to form more continuous free blocks, and optionally, the solid state disk 111 is scanned to merge partially-occupied data blocks.

Of course, the above levels of reliability requirement are only exemplary. In embodiments of the present invention, other reliability requirement levels can be used.

Therefore, according to these embodiments of the present invention, the storage control means 210 is configured to: in response to starting to process a read request to a file, determine whether the file exists in the multiple solid state disks 111; in response to determining that the file exists in the multiple solid state disks 111, read the file from the multiple solid state disks 111; in response to determining that the file does not exist in the multiple solid state disks 111, read the file from the multiple non-solid state disks 112; in response to starting to process a write request to a new file, determine the level of availability requirement of the new file; according to the level of availability requirement of the new file, write the new file into at least one of the multiple solid state disks 111 and the multiple non-solid state disks 112. That is to say, a new file with a higher level of availability requirement is written into more disks of the multiple solid state disks 111 and the non-solid state disks 112.

According to theses embodiments of the present invention, the storage control means 120 is further configured to: in response to reading a file from the multiple solid state disks 111 or the multiple non-solid state disks 112, update the access frequency of the file; in the scrubbing mode, in response to determining that the access frequency of a file is higher than a predetermined threshold, and the file only exists in the multiple non-solid state disks 112 and the multiple solid state disks 111 have sufficient available space, transfer the file from the multiple non-solid state disks 112 to the multiple solid state disks 111; and in the scrubbing mode, in response to determining that the access frequency of a file is lower than a predetermined threshold, and the file only exists in the multiple solid state disks 111, transfer the file from the multiple solid state disks 111 to the multiple non-solid state disks 112.

According to these embodiments of the present invention, the storage control means 120 is further configured to: in response to entering the scrubbing mode, scan the multiple non-solid state disks 112 and move the data blocks therein, so as to form more continuous free blocks.

According to a further embodiment of the present invention, the storage control means 120 is further configured to: in the scrubbing mode, scan and merge partially-occupied data blocks in the multiple solid state disks 111 in the disk array 110, to form more entirely free blocks.

In some other embodiments of the present invention, the storage array of the storage system may comprise the same number of multiple solid state disks 111 and multiple non-solid state disks 112, and each of the solid state disks 111 and each of the non-solid state disks 112 form a unit (which may be called N+N mode), e.g., 4 solid state disks 111 and 4 non-solid state disks 112 form 4 units, each unit comprising one solid state disk 111 and one non-solid state disk 112. In such a mode, the storage control means 120 performs the various operations described above with respect to each unit, and the units are combined together as needed, e.g., forming RAID0, RAID1 or RAID5, etc.

Above is described the storage system according to an embodiment of the present invention. It should be pointed out that the above description is only exemplary, rather than limitation to the present invention. In other embodiments of the present invention, the storage system may have more, less or different modules, and the storage control means of the storage system may be configured to perform more, less or different operations.

In the following a method for realizing a storage system according to an embodiment of the present invention is described by referring to the accompanying drawings. The steps of the method correspond to the respective operations of the storage system according to an embodiment of the present invention as described above. For simplicity, some details repeating with the above description is omitted in the following description. Therefore, the method may be understood in greater detail by referring to the above description.

According to an embodiment of the present invention, a method for realizing a storage system is provided, wherein the storage system comprises a disk array, the disk array comprises at least one solid state disk and at least one non-solid state disk, the method comprising the following steps: in response to entering a scrubbing mode, scan and move the data blocks in the at least one non-solid disk of the disk array to form more continuous free blocks.

Figure 2A:
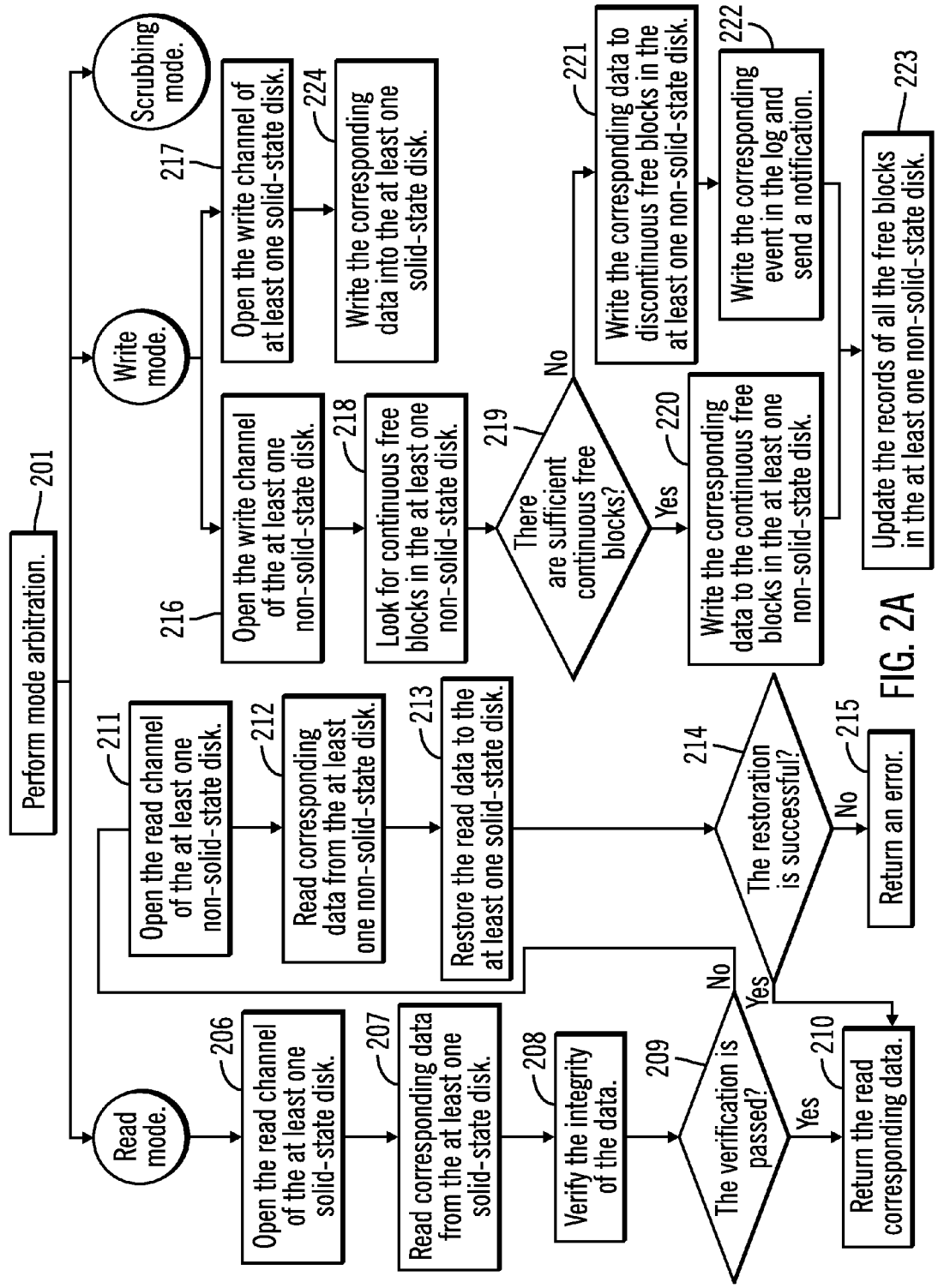
FIG. 2 shows a method for realizing a storage system according to an embodiment of the present invention.
Figure 2B:
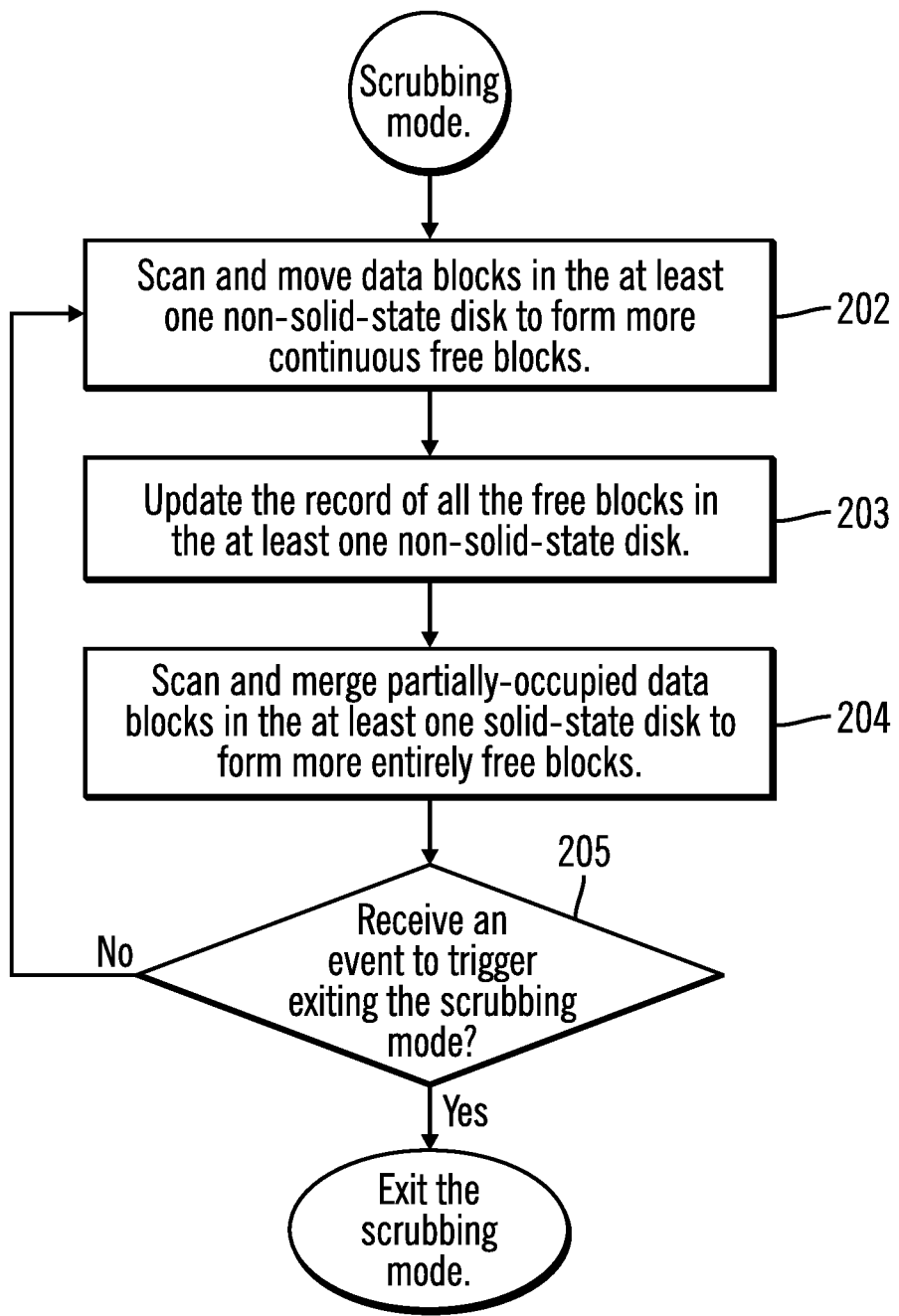

FIGS. 2A and 2B show a specific implementation of the method for realizing a storage system according to an embodiment of the present invention. As shown, the method comprises the following steps:

With respect to FIG. 2A, in step 201, perform mode arbitration to determine entering which one of the read mode, the write mode and scrubbing mode.

Many methods can be used to perform the mode arbitration. For example, when a read request from an upper level application 102 is received and the request starts to be processed, it is determined that the read mode is entered; when a write request from an upper level application 102 is received and the request starts to be processed, it is determined that the write mode is entered; when a specific event triggering entering the scrubbing mode as specified by a specific policy (e.g., any one of the above policies) is received, the scrubbing mode is entered. For example, the scrubbing mode may be entered in response to one of the following events: no read or write request is received within a predetermined time threshold; determining that the disk bandwidth utilization is lower than a predetermined bandwidth utilization threshold; determining that the length of the queue for receiving read requests and write requests from an upper level application 102 is lower than a predetermined queue length threshold; and receiving a command to enter the scrubbing mode.

In step 202 (FIG. 2B), in response to entering the scrubbing mode, scan and move data blocks in the at least one non-solid state disk in the disk array to form more continuous free blocks.

In step 203, update the record of all the free blocks in the at least one non-solid state disk.

In step 204, scan and merge partially-occupied data blocks in the at least one solid state disk in the disk array to form more entirely free blocks.

In step 205, determine whether a specific event to trigger exiting the scrubbing mode is received, which specific event may be the specific event to trigger exiting the scrubbing mode specified by the various policies described above, e.g., the ratio of the continuous free blocks to all the free blocks in the non-solid state disk exceeds the predetermined ratio threshold C, etc.

If the decision is no, return to step 202. If the decision is yes, exit the scrubbing mode.

According to an embodiment of the present invention, the method further comprises the following steps:

In step 206 (FIG. 2A), in response to entering the read mode, open the read channel of the at least one solid state disk.

In step 207, read the corresponding data from the at least one solid state disk.

In an optional step 208, verify the integrity of the corresponding data.

In an optional step 209, determine whether the verification is passed.

If the decision is yes, turn to step 210; otherwise, turn to step 211.

In step 210, return the read corresponding data to the upper level application 102.

In step 211, open the read channel of the at least one non-solid state disk.

In step 212, read the corresponding data from the at least one non-solid state disk.

In step 213, restore the read corresponding data to the at least one solid state disk.

In step 214, determine whether the restoration is successful.

If the decision is yes, turn to step 210 to return the read corresponding data to the upper level application 102. Otherwise, turn to step 215.

In step 215, return an error, and optionally record the error in the log or send an error notification.

According to an embodiment of the present invention, the method further comprises the following steps:

In response to entering the write mode, open the write channel of the at least one solid state disk in step 216 (FIG. 2A), and open the write channel of the at least one non-solid state disk in step 217.

In step 218, look for continuous free blocks in the at least one non-solid state disk.

In step 219, determine whether there are sufficient continuous free blocks in the at least one non-solid state disk.

If the decision is yes, turn to step 220; if the decision is no, turn to step 221.

In step 220, write the corresponding data to the continuous free blocks in the at least one non-solid state disk.

In step 221, write the corresponding data to discontinuous free blocks in the at least one non-solid state disk.

In an optional step 222, record the corresponding event into the log and send a notification, the corresponding event may be, e.g., being unable to find sufficient continuous free blocks in the non-solid state disk.

In step 223, update the record of the all the free blocks in the at least one non-solid state disk.

In step 224, write the corresponding data into the at least one solid state disk.

Above is only one specific implementation of the method for realizing a storage system according to an embodiment of the present invention, and not limitation to the present invention. The method for realizing a storage system may have other specific implementations.

Figure 3:
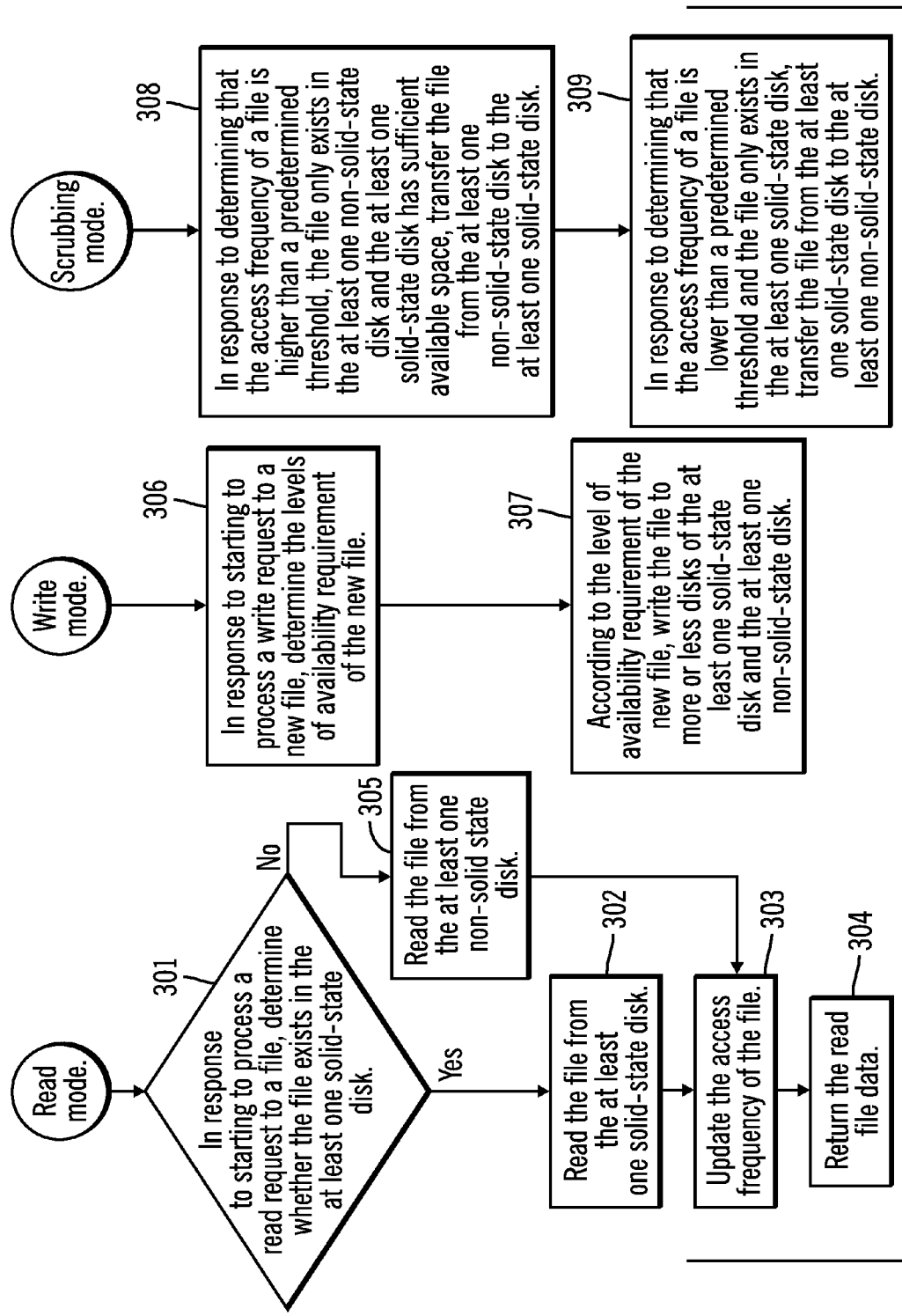
FIG. 3 shows a method for realizing a storage system according to another embodiment of the present invention.

FIG. 3 describes a method for realizing a storage system according to another embodiment of the present invention, wherein the storage system comprises a disk array, the disk array comprising at least one solid state disk and at least one non-solid state disk. In the following description of the embodiment, steps which are the same as in the embodiment shown in FIGS. 2A and 2B are omitted, e.g., the step of performing mode arbitration, the steps in the scrubbing mode to scrub the non-solid state disks and the solid state disks which are the same as those in the embodiments of FIGS. 2A and 2B, and the steps for opening a channel in the read mode and write mode.

As shown in FIG. 3, the method comprises the following steps:

In step 301, in a read mode, in response to starting to process a read request to a file, determine whether the file exists in the at least one solid state disk.

If the decision is yes, turn to step 302; if the decision is no, turn to step 304.

In step 302, read the file from the at least one solid state disk.

In step 303, update the access frequency of the file.

In step 304, return the read file data to the upper level application 102.

In step 305, read the file from the at least one non-solid state disk, and then turn to step 303.

In step 306, in a write mode, in response to starting to process a write request to a new file, determine the level of availability requirement of the new file.

In step 307, write the new file into at least one disk of the at least one solid state disk and the at least one non-solid state disk according to the level of availability requirement of the new file.

In step 308, in the scrubbing mode, in response to determining that the access frequency of a file is higher than a predetermined threshold, the file only exists in the at least one non-solid state disk and the at least one solid state disk has sufficient available space, transfer the file from the at least one non-solid state disk to the at least one solid state disk.

In step 309, in response to determining that the access frequency of a file is lower than a predetermined threshold and the file only exists in the at least one solid state disk, transfer the file from the at least one solid state disk to the at least one non-solid state disk.

According to an embodiment of the present invention, the priority of the I/O requests generated in the scrubbing mode is lower than the priority of the read requests and write requests from an upper level application 102.

According to an embodiment of the present invention, the at least one non-solid state disk is a hard disk or an erasable optical disk.

According to an embodiment of the present invention, the method is realized by a device driver in the operating system 100.

Above are described methods according to embodiments of the present invention.

It should be pointed out that the above description is only exemplary, rather than a limitation to the present application. In other embodiments of the present invention, the method may have more, less or different steps, and the relationship between the steps may be different from that is described. Although for the convenience of description and illustration, the steps in the above embodiments have a specific order, some of the steps may have different order or be executed in parallel. For example, step 204 may also be executed prior to or parallel to step 203; step 309 may also be executed before or parallel to step 308. Some of the above steps are optional, or may be combined with other steps. For example, steps 206, 211, 216, 217 are optional steps, or they can be combined with their respective subsequent steps to form one step; steps 208, 209, 213, 214, 215, 222, 204 are also optional steps.

The following table shows comparisons between the read and write performances as well as the cost of the storage system according to an embodiment of the present invention and the read and write performances as well as the costs of several storage systems of the prior art:

|  | Read throughput | Read latency | Write throughput | Write latency | Cost ($/GB) |
|---|---|---|---|---|---|
| SSD RAID 1 | 250 MB/s | 0.03 ms | 170 MB/s | 0.3 ms | 20 |
| SATA RAID 1 | Less than 40 MB/s | 2.5 ms | Less than 20 MB/s | 8 ms | 0.12 |
| SATA RAID 5 (e.g., 3 + 1) | Less than 60 MB/s | 1.7 ms | 5 MB/s | 30 ms | 0.08 |
| SSD RAID5 storage system of the invention | high 150 MB/s | Low 0.03 ms | low 170 MB/s | long Less than 1 ms | high 6-7 |

As can be seen from the above table, compared with the existing array formed by SATA, the storage system according to an embodiment of the present invention has better read and write performances, and the cost only increases slightly. Compared with the existing array formed by solid state disks, the storage system according to embodiments of the present invention has comparable and substantially balanced read performance and write perform, and the cost is reduced greatly. Of course, besides the above advantages, the storage system according to an embodiment of the present invention further has the advantages of high data reliability and availability.

The advantages of the described embodiments include one or more of the following: the storage system not only gets good read performance by reading data from the solid state disk, but also has good write performance by scrub the non-solid state disk in the scrubbing mode to form more continuous free blocks; improving data reliability and availability by writing data into the solid state disk as well as the non-solid state disk; improving the write speed and life span of the solid state disk and reducing the cost by realizing the functions of merging partially-occupied blocks and the wear-leveling algorithm in the driver of the operating system 100.

Although the present invention is illustrated and described by referring to the preferred embodiments, those skilled in the art should appreciate that various changes both in form and details can be made thereto without departing from the spirit and scope of the present invention. The above description is only an exemplary illustration of embodiments of the present invention, in order to make those skilled in the art better understand the present invention, rather than limitation to the present application. The scope of the present invention is only limited by the appended claims.

The invention claimed is:

1. A storage system, comprising:
a disk array comprising at least one solid state disk and at least one non-solid state disk; and
a storage control component configured to perform operations, the operations comprising:
performing read and write operations with respect to the at least one solid state disk and the at least one non-solid state disk;
in response to receiving a write request to a file, determining whether the file has a high availability requirement;
in response to determining that the file has the high availability requirement, entering a write mode in which separate operations are both initiated to write the file of the write request to both the at least one solid state disk and the at least one non-solid state disk as part of the write mode operations;
in response to determining that the file does not have the high availability requirement, writing the file of the write to the non-solid state disk but not the solid state disk;
transferring a file from the non-solid state disk to the solid state disk in response to the file not having the high availability requirement and having an access frequency exceeding a threshold;
entering a scrubbing mode;
in response to entering the scrubbing mode, scanning and moving data blocks in the at least one non-solid state disk in the disk array to form continuous free blocks;
determining a ratio of the continuous free blocks to all free blocks in the at least one non-solid state disk; and
in response to determining that the ratio of the continuous free blocks to all the free blocks in the at least one non-solid state disk exceeds a predetermined ratio threshold, exiting the scrubbing mode.

2. The storage system of claim 1, wherein the storage control component is further configured to perform:
in response to entering a read mode, reading corresponding data from the at least one solid state disk; and
in response to entering the write mode, writing corresponding data to the at least one solid state disk and the at least one non-solid state disk.

3. The storage system of claim 2, wherein the storage control component is further configured to perform:
verifying integrity of the corresponding data after reading the corresponding data from the at least one solid state disk;
in response to verifying the integrity, returning the corresponding data to an upper level application; and
in response to not verifying the integrity, reading corresponding data from the at least one non-solid state disk, restoring the corresponding data to the at least one solid state disk, and returning the corresponding data to the upper level application.

4. The storage system of claim 1, wherein the storage control component is further configured to perform:
in response to starting to process a read request to a file, determining whether the file exists in the at least one solid state disk;
in response to determining that the file exists in the at least one solid state disk, reading the file from the at least one solid state disk; and
in response to determining that the file does not exists in the at least one solid state disk, reading the file from the at least one non-solid state disk.

5. The storage system of claim 1, wherein the storage control component is further configured to perform:
in response to reading a file from the at least one solid state disk or the at least one non-solid state disk, updating an access frequency of the file;
wherein the file is transferred from the non-solid state disk to the solid state disk in the scrubbing mode in response to determining that the access frequency of the file is higher than a predetermined threshold, the file only exists in the at least one non-solid state disk and the at least one solid state disk has sufficient available space; and in the scrubbing mode, in response to determining that the access frequency of the file is lower than a predetermined threshold and the file only exists in the at least one solid state disk, transferring the file from the at least one solid state disk to the at least one non-solid state disk.

6. The storage system of claim 1, wherein the storage control component is further configured to perform:
entering the scrubbing mode in response to determining one of a following events:
not receiving a read or write request within a predetermined time threshold;
determining that disk bandwidth utilization is lower than a predetermined bandwidth utilization threshold;
determining that a queue length for receiving read requests and write requests from an upper level application is lower than a predetermined queue length threshold; and
receiving a command to enter the scrubbing mode.

7. A method, comprising:
performing read and write operations with respect to a disk array comprising at least one solid state disk and at least one non-solid state disk;
in response to receiving a write request to a file, determining whether the file has a high availability requirement;
in response to determining that the file has the high availability requirement, entering a write mode in which separate operations are both initiated to write the file of the write request to both the at least one solid state disk and the at least one non-solid state disk;
in response to determining that the file does not have the high availability requirement, writing the file of the write to the non-solid state disk but not the solid state disk;
transferring a file from the non-solid state disk to the solid state disk in response to the file not having the high availability requirement and having an access frequency exceeding a threshold; and
entering a scrubbing mode;
in response to entering the scrubbing mode, scanning and moving data blocks in the at least one non-solid state disk in the disk array to form continuous free blocks;
determining a ratio of the continuous free blocks to all free blocks in the at least one non-solid state disk; and
in response to determining that the ratio of the continuous free blocks to all the free blocks in the at least one non-solid state disk exceeds a predetermined ratio threshold, exiting the scrubbing mode.

8. The method of claim 7, further comprising:
in response to entering a read mode, reading corresponding data from the at least one solid state disk; and
in response to entering the write mode, writing corresponding data to the at least one solid state disk and the at least one non-solid state disk.

9. The method of claim 8, further comprising:
verifying integrity of the corresponding data after reading the corresponding data from the at least one solid state disk;
in response to verifying the integrity, returning the corresponding data to an upper level application;

in response to not verifying the integrity, performing:
reading corresponding data from the at least one non-solid state disk;
restoring the corresponding data to the at least one solid state disk; and
returning the corresponding data to the upper level application.

10. The method of claim 8, wherein the writing the corresponding data to the at least one non-solid state disk comprises:
determining continuous free blocks in the at least one non-solid state disk; and
writing the corresponding data to the continuous free blocks in the at least one non-solid state disk.

11. The method of claim 7, further comprising:
in response to starting to process a read request to a file, determining whether the file exists in the at least one solid state disk;
in response to determining that the file exists in the at least one solid state disk, reading the file from the at least one solid state disk; and
in response to determining that the file does not exist in the at least one solid state disk, reading the file from the at least one non-solid state disk.

12. The method of claim 7, further comprising:
in response to reading a file from the at least one solid state disk or the at least one non-solid state disk, updating the access frequency of the file;
wherein the file is transferred from the non-solid state disk to the solid state disk in the scrubbing mode in response to determining that the access frequency of the file is higher than a predetermined threshold, the file only exists in the at least one non-solid state disk and the at least one solid state disk has sufficient available space; and in the scrubbing mode, in response to determining that the access frequency of the file is lower than a predetermined threshold, and the file only exists in the at least one solid state disk, transferring the file from the at least one solid state disk to the at least one non-solid state disk.

13. The method of claim 7, further comprising:
in the scrubbing mode, scanning and merging partially-occupied data blocks in the at least one solid state disk in the disk array to form more entirely free blocks.

14. The method of claim 7, further comprising:
entering the scrubbing mode in response to one of following events:
not receiving a read or write request within a predetermined time threshold;
determining that a disk bandwidth utilization is lower than a predetermined disk bandwidth utilization threshold;
determining that a queue length for receiving read requests and write requests from an upper level application is lower than a predetermined queue length threshold; and
receiving a command to enter the scrubbing mode.

15. The method of claim 14, wherein a processing priority of I/O requests generated in the scrubbing mode is lower than the processing priority of the read requests and write requests from the upper level application.

16. A device implementing a storage control component coupled to a disk array comprising at least one solid state disk and at least one non-solid state disk, wherein the storage control component performs operations, the operations comprising:

performing read and write operations with respect to the at least one solid state disk and the at least one non-solid state disk;

in response to receiving a write request to a file, determining whether the file has a high availability requirement;

in response to determining that the file has the high availability requirement, entering a write mode in which separate operations are both initiated to write the file of the write request to both the at least one solid state disk and the at least one non-solid state disk;

in response to determining that the file does not have the high availability requirement, writing the file of the write to the non-solid state disk but not the solid state disk;

transferring a file from the non-solid state disk to the solid state disk in response to the file not having the high availability requirement and having an access frequency exceeding a threshold;

entering a scrubbing mode;

in response to entering the scrubbing mode, scanning and moving data blocks in the at least one non-solid state disk in the disk array to form continuous free blocks;

determining a ratio of the continuous free blocks to all free blocks in the at least one non-solid state disk; and in response to determining that the ratio of the continuous free blocks to all the free blocks in the at least one non-solid state disk exceeds a predetermined ratio threshold, exiting the scrubbing mode.

17. The device of claim 16, wherein the storage control component is further configured to perform:

in response to entering a read mode, reading corresponding data from the at least one solid state disk; and in response to entering the write mode, writing corresponding data to the at least one solid state disk and the at least one non-solid state disk.

18. The device of claim 17, wherein the storage control component is further configured to perform:

verifying integrity of the corresponding data after reading the corresponding data from the at least one solid state disk;

in response to verifying the integrity, returning the corresponding data to an upper level application; and in response to not verifying the integrity, reading corresponding data from the at least one non-solid state disk, restore the corresponding data to the at least one solid state disk, and return the corresponding data to the upper level application.

19. The device of claim 16, wherein the storage control component is further configured to perform:

in response to starting to process a read request to a file, determining whether the file exists in the at least one solid state disk;

in response to determining that the file exists in the at least one solid state disk, reading the file from the at least one solid state disk; and in response to determining that the file does not exists in the at least one solid state disk, reading the file from the at least one non-solid state disk.

20. The device of claim 16, wherein the storage control component is further configured to perform:

in response to reading a file from the at least one solid state disk or the at least one non-solid state disk, updating the access frequency of the file;

wherein the file is transferred from the non-solid state disk to the solid state disk in the scrubbing mode in response to determining that the access frequency of the file is higher than a predetermined threshold, the file only exists in the at least one non-solid state disk and the at least one solid state disk has sufficient available space; and in the scrubbing mode, in response to determining that the access frequency of the file is lower than a predetermined threshold and the file only exists in the at least one solid state disk, transferring the file from the at least one solid state disk to the at least one non-solid state disk.

21. The device of claim 16, wherein the storage control component is further configured to perform:

enter the scrubbing mode in response to determining one of a following events:

not receiving a read or write request within a predetermined time threshold;

determine that disk bandwidth utilization is lower than a predetermined bandwidth utilization threshold;

determining that a queue length for receiving read requests and write requests from an upper level application is lower than a predetermined queue length threshold; and receiving a command to enter the scrubbing mode.

22. The device of claim 16, wherein the storage control component comprises a device driver in an operating system.

* * * * *